(12) United States Patent
Wang et al.

(10) Patent No.: US 10,517,041 B2
(45) Date of Patent: *Dec. 24, 2019

(54) SMALL CELL THERMAL CONTROL

(71) Applicant: Google LLC, Mountain View, CA (US)

(72) Inventors: Jibing Wang, San Jose, CA (US);
Dieter W. Statezni, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,679

(22) Filed: May 9, 2019

(65) Prior Publication Data
US 2019/0268843 A1    Aug. 29, 2019

Related U.S. Application Data

(63) Continuation of application No. 15/265,103, filed on Sep. 14, 2016, now Pat. No. 10,334,520.

(51) Int. Cl.
*H04W 52/02* (2009.01)
*H04W 72/04* (2009.01)

(52) U.S. Cl.
CPC ... *H04W 52/0206* (2013.01); *H04W 52/0212* (2013.01); *H04W 72/048* (2013.01); *Y02D 70/00* (2018.01); *Y02D 70/1242* (2018.01); *Y02D 70/1262* (2018.01); *Y02D 70/142* (2018.01); *Y02D 70/24* (2018.01)

(58) Field of Classification Search
CPC .............................. G06F 1/3296; G06F 1/3206
See application file for complete search history.

(56) References Cited

U.S. PATENT DOCUMENTS

| | | |
|---|---|---|
| 2002/0136174 A1 | 9/2002 | Gleeson |
| 2008/0025341 A1 | 1/2008 | Rao et al. |
| 2008/0316996 A1 | 12/2008 | Hatala |
| 2014/0038588 A1 | 2/2014 | Ljung |
| 2014/0091624 A1 | 4/2014 | Park et al. |
| 2015/0011211 A1 | 1/2015 | Plestid et al. |
| 2016/0147291 A1 | 5/2016 | Thomas et al. |

FOREIGN PATENT DOCUMENTS

| | | |
|---|---|---|
| EP | 2575258 A2 | 4/2013 |
| EP | 2938119 A1 | 10/2015 |

OTHER PUBLICATIONS

International Search Report and Written Opinion for the Application No. PCT/US2017/049265 dated Nov. 9, 2017.

*Primary Examiner* — Joshua L Schwartz
(74) *Attorney, Agent, or Firm* — Honigman LLP; Brett A. Krueger (57) ABSTRACT

A method of controlling a temperature of a femtocell includes receiving, at data processing hardware of the femtocell, temperature measurements from a temperature sensor configured to measure a temperature of at least one of the data processing hardware or a power amplifier of the femtocell. The method further includes determining, by the data processing hardware, whether the femtocell is operating above a threshold temperature based on the temperature measurements. When the femtocell is operating above the threshold temperature, the method includes modifying, by the data processing hardware, a power consumption characteristic of the femtocell that results in a power consumption reduction of at least one of the data processing hardware or the power amplifier.

20 Claims, 5 Drawing Sheets

SMALL CELL THERMAL CONTROL

CROSS REFERENCE TO RELATED APPLICATIONS

This U.S. patent application is a continuation of, and claims priority under 35 U.S.C. § 120 from, U.S. patent application Ser. No. 15/265,103, filed on Sep. 14, 2016. The disclosure of this prior application is considered part of the disclosure of this application and is hereby incorporated by reference in its entirety.

TECHNICAL FIELD

This disclosure relates to controlling a temperature of a cellular base station.

BACKGROUND

Wireless communication networks provide communication content, such as voice, video, packet data, messaging, and broadcast. A wireless communication network may support operation on multiple carriers, each carrier including a range of frequencies used for communication and associated with system information describing operation of the carrier. A Long-Term Evolution (LTE) network provides wireless communication of high-speed data for User Equipment (UE) and communication terminals, such as ground base-stations and high altitude platforms (HAPs). LTE networks increase the capacity and speed of existing radio access network (RAN) technologies by using a different radio interface with core network improvements. The wireless communication network may include a number of communication terminals that can support communication for a number of UEs. A mobile terminal (e.g., UE) may communicate with a communication terminal via downlink and optionally an uplink.

In general, in telecommunications, a femtocell (also referred to as a small cell) is a small, low-power cellular base station, typically designed for use in a home or a small business, such as a hotel. A femtocell typically connects to a network of a service provider, e.g., via a broadband connection. Use of femtocells usually benefits both a mobile operator and a consumer. For the mobile operator, the femtocell can improve both coverage, especially indoors, and capacity. Coverage is improved because femtocells can fill in the gaps and eliminate loss of signal through buildings. Capacity is improved by a reduction in the number of phones attempting to use the main network cells and by the off-load of traffic through the user's network (via the internet) to the operator's infrastructure. Instead of using the operator's private network (microwave links, etc.), the mobile operator can use the Internet. Under certain conditions, a femtocell may experience high temperatures. To mitigate the high temperatures, a relatively large heat sink can be applied to the femtocell (e.g., to dissipate heat).

SUMMARY

Adding a heat sink to a femtocell generally increases a practical form factor and affects an industrial design of the femtocell. Moreover, the heat sink increases the overall cost of the femtocell as well. Both of those issues can hamper the use of a femtocell in a variety of applications, ranging from use on an aerial device to use in a small confined location. The present disclosure provides solutions for regulating the temperature of the femtocell by managing the use of the femtocell without requiring additional heat dissipating measures, such as the heat sink.

One aspect of the disclosure provides a method of controlling a temperature of a femtocell. The method includes receiving, at data processing hardware of a femtocell, temperature measurements from a temperature sensor configured to measure a temperature of at least one of the data processing hardware or a power amplifier of the femtocell. The method further includes determining, by the data processing hardware, whether the femtocell is operating above a threshold temperature based on the temperature measurements. When the femtocell is operating above the threshold temperature, the method includes modifying, by the data processing hardware, a power consumption characteristic of the femtocell that results in a power consumption reduction of at least one of the data processing hardware or the power amplifier.

Implementations of the disclosure may include one or more of the following optional features. In some implementations, modifying the power consumption characteristic includes reducing a physical downlink shared channel frequency resource and/or a physical uplink shared channel frequency resource to communicate with UEs. In some examples, reducing the physical downlink shared channel frequency resource includes scheduling a fewer number of UEs per downlink subframe of a corresponding downlink communication frame (e.g., scheduling a reduced number of UEs than currently scheduled for a downlink subframe). Similarly, reducing the physical uplink shared channel frequency resource to communicate with UEs may include scheduling a fewer number of UEs per uplink subframe of a corresponding uplink communication frame.

In some implementations, reducing the physical downlink shared channel frequency resource and/or the physical uplink shared channel frequency resource includes scheduling a fewer number of resource blocks per UE. Each communication frame includes sub-frames, which include resource blocks.

In additional implementations, modifying the power consumption characteristic includes reducing a power spectral density of the power amplifier. The power spectral density is a measure of a physical downlink shared channel.

In yet additional implementations, modifying the power consumption characteristic includes reducing a number of UEs communicating with the femtocell. For example, the method may include denying access requests from UEs.

In some implementations, modifying the power consumption characteristic includes changing a reception mode of one or more UEs communicating with the femtocell to a discontinuous mode, such as a discontinuous reception mode. Additionally or alternatively, modifying the power consumption characteristic may include reducing a transmission duty cycle and/or a reception duty cycle of the femtocell.

Another aspect of the disclosure provides a femtocell that includes a power amplifier, data processing hardware, a temperature sensor, and memory hardware in communication with the data processing hardware. The temperature sensor is configured to measure a temperature of at least one of the data processing hardware or the power amplifier. The memory hardware stores instructions that when executed on the data processing hardware cause the data processing hardware to perform operations. The operations include receiving temperature measurements from the temperature sensor, determining whether the femtocell is operating above a threshold temperature based on the temperature measurements, and, when the femtocell is operating above the threshold temperature, modifying a power consumption characteristic that results in a power consumption reduction of at least one of the data processing hardware or the power amplifier.

This aspect may include one or more of the following optional features. In some implementations, modifying the power consumption characteristic includes reducing a physical downlink shared channel frequency resource and/or a physical uplink shared channel frequency resource to communicate with UEs. In some examples, reducing the physical downlink shared channel frequency resource includes scheduling a fewer number of UEs per downlink subframe of a corresponding downlink communication frame. Similarly, reducing the physical uplink shared channel frequency resource to communicate with UEs may include scheduling a fewer number of UEs per uplink subframe of a corresponding uplink communication frame.

In some implementations, reducing the physical downlink shared channel frequency resource and/or the physical uplink shared channel frequency resource includes scheduling a fewer number of resource blocks per UE. Each communication frame includes sub-frames, which include resource blocks.

In additional implementations, modifying the power consumption characteristic includes reducing a power spectral density of the power amplifier. The power spectral density is a measure of a physical downlink shared channel.

In yet additional implementations, modifying the power consumption characteristic includes reducing a number of UEs communicating with the femtocell. For example, the method may include denying access requests from UEs.

In some implementations, modifying the power consumption characteristic includes changing a reception mode of one or more UEs communicating with the femtocell to a discontinuous mode, such as a discontinuous reception mode. Additionally or alternatively, modifying the power consumption characteristic may include reducing a transmission duty cycle and/or a reception duty cycle of the femtocell.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
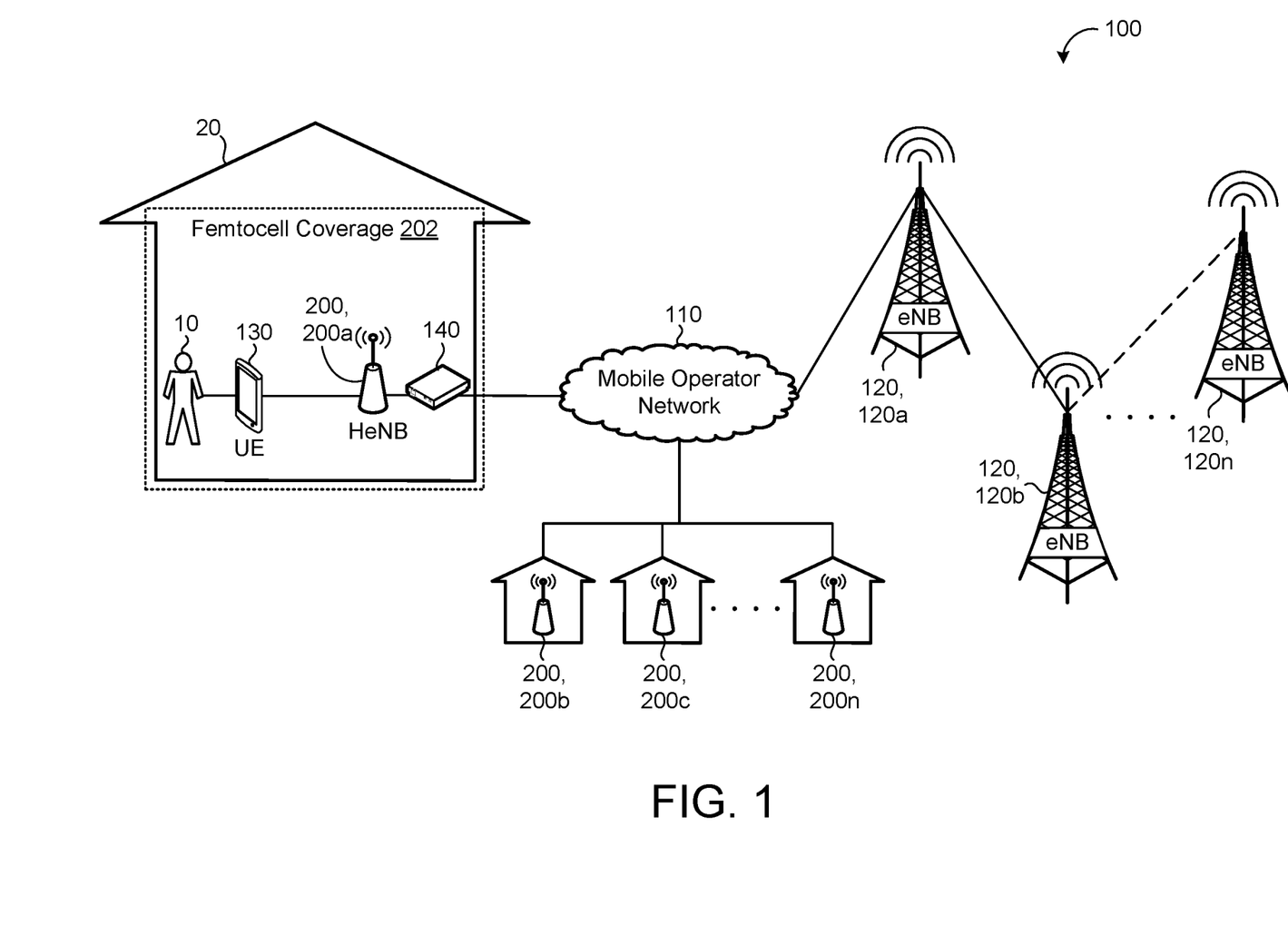
FIG. 1 is a schematic view of an example communication system.

Referring to FIG. 1, in some implementations, a communication system 100 includes a mobile operator network 110 having one or more base stations 120, 120*a-n*. In some examples, the base stations 120 are Evolved node Bs (also referred to as eNodeB or eNB). An eNB is hardware that connects to the mobile operator network 110 and communicates directly with one or more user equipment (UE) 130 of corresponding users 10. As used herein, the terms UE 130 and "mobile terminal" are used interchangeably. In some implementations, the eNB 120 does not have a separate controller element, thus simplifying the architecture of the mobile operator network. The base station 120 that is communicating with a UE 130 is known as its serving eNB 120, and it is used to transmit/receive radio data to/from the UE 130.

The mobile operator network 110 may include one or more macrocells, femtocells, picocells, or microcells, each defining a coverage range of the mobile operator network 110. In the example shown, the mobile operator network 110 includes one or more femtocells 200, 200*a-n*. Home eNodeB (HeNB) is the 3GPP's term for a femtocell or Small cell. In general, a femtocell 200 is a low-power wireless base station that provides cellular access in areas with limited or no cellular access. The femtocell 200 is typically designed for use in a premise 20, such as a home or small business, and belongs to the closed subscriber group (CSG). The femtocell 200 can be an access point that operates in a licensed spectrum and is configured to route mobile phone traffic through an internet protocol (IP) network, such as the mobile operator network 110. The femtocell 200 is connected to a broadband 140 (cable modem or Digital Subscriber Line) and provides complete voice and data service to UEs 130, e.g., standard mobile devices, such as cell phones or PDAs that are registered and within a femtocell coverage 202, which may be of limited range (e.g., generally less than 10 meters). To ease the installation burden, the femtocell 200 may be designed to be user friendly and plug-and-play with features that may include automatic detection of the Internet service provider (ISP), automatic registration, authentication to the mobile operator network 110, self-upgrades, location check, and transmit power adjustment, among other features. The femtocell 200 should not be confused with repeaters generally called signal boosters, which are only used to improve existing macrocell coverage.

In some implementations, the femtocell 200 is Long-Term Evolution (LTE) femtocell. LTE is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). LTE networks can include terrestrial networks associated with communication terminals positioned on earth, non-terrestrial networks associated with communication terminals not positioned on earth, or a network that supports LTE and includes both terrestrial and non-terrestrial networks.

Figure 2:
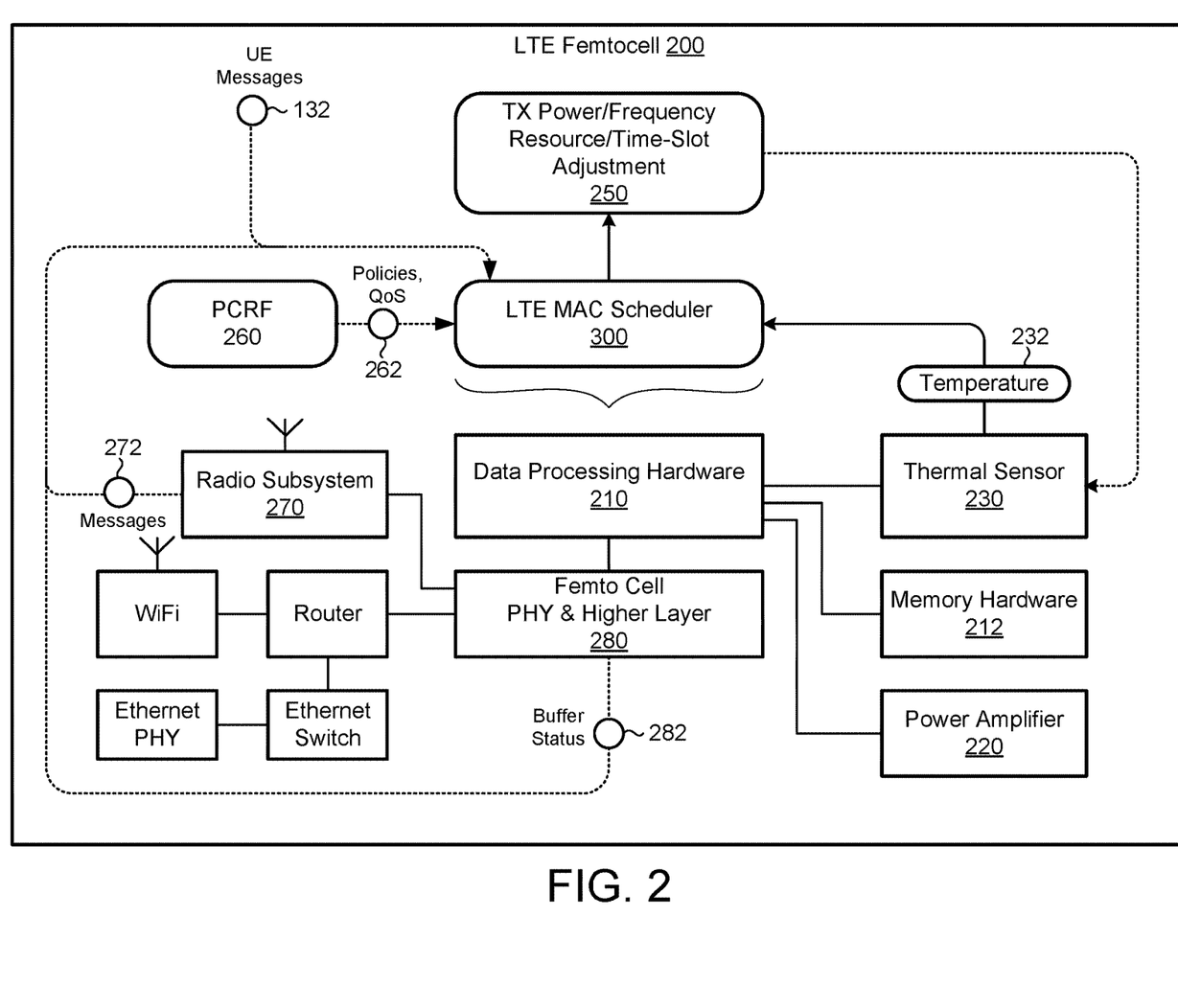
FIG. 2 is a schematic view of an example femtocell.

FIG. 2 provides a schematic view of an example femtocell 200. In some implementations, the femtocell 200 includes data processing hardware 210 in communication with memory hardware 212 and powered by a power amplifier 220, which receives power from a power source (e.g., 110V or 220V AC). The data processing hardware 210 and the power amplifier 220 generally release heat during usage. To manage a temperature level of the femtocell 200, the data processing hardware 210 may be in communication with a temperature sensor 230 and execute a MAC scheduler 300 (e.g., an LTE MAC scheduler), based on instructions stored in the memory hardware 212, that determines an adjustment 250 (e.g., a transmit (TX) power/frequency, resource/time-slot adjustment) based on one or more temperature measurements 232 received from the temperature sensor 230. The MAC scheduler 300 has control over the orthogonal frequency division multiplexing (OFDM) modulation in the sense that it decides, according to information received from other LTE network components, how much bandwidth each UE 130 receives at any given moment. OFDM splits data into small sub-carriers, also known as data streams, on neighboring frequencies, over a single channel. OFDM allows sending more data than through single carrier modulation techniques, and at a higher rate. OFDM also handles phenomena such as interference, noise or multipath significantly more efficiently than other modulation methods.

In order to make its resource allocation decisions, the MAC Scheduler 300 may receive information from a Policy and Charging Rules Function (PCRF) 260, such as policies and quality of service (QoS) data 262. The QoS data 262 may include a minimum guaranteed bandwidth, maximum allowed bandwidth, packet loss rates, relative priority of users, etc. The MAC Scheduler 300 may also receive messages 132 from the UEs 130 regarding a radio channel quality, a strength or weakness of a corresponding signal, and/or additional information. The MAC Scheduler 300 may receive measurements 272 from a radio subsystem 270, which is in communication with the data processing hardware 210, regarding radio channel quality, noise and interference, etc. Moreover, the MAC Scheduler 300 may receive a buffer status 282 from an upper layer 280 about how much data is queued up waiting for transmission.

MAC Scheduler

Figure 3:
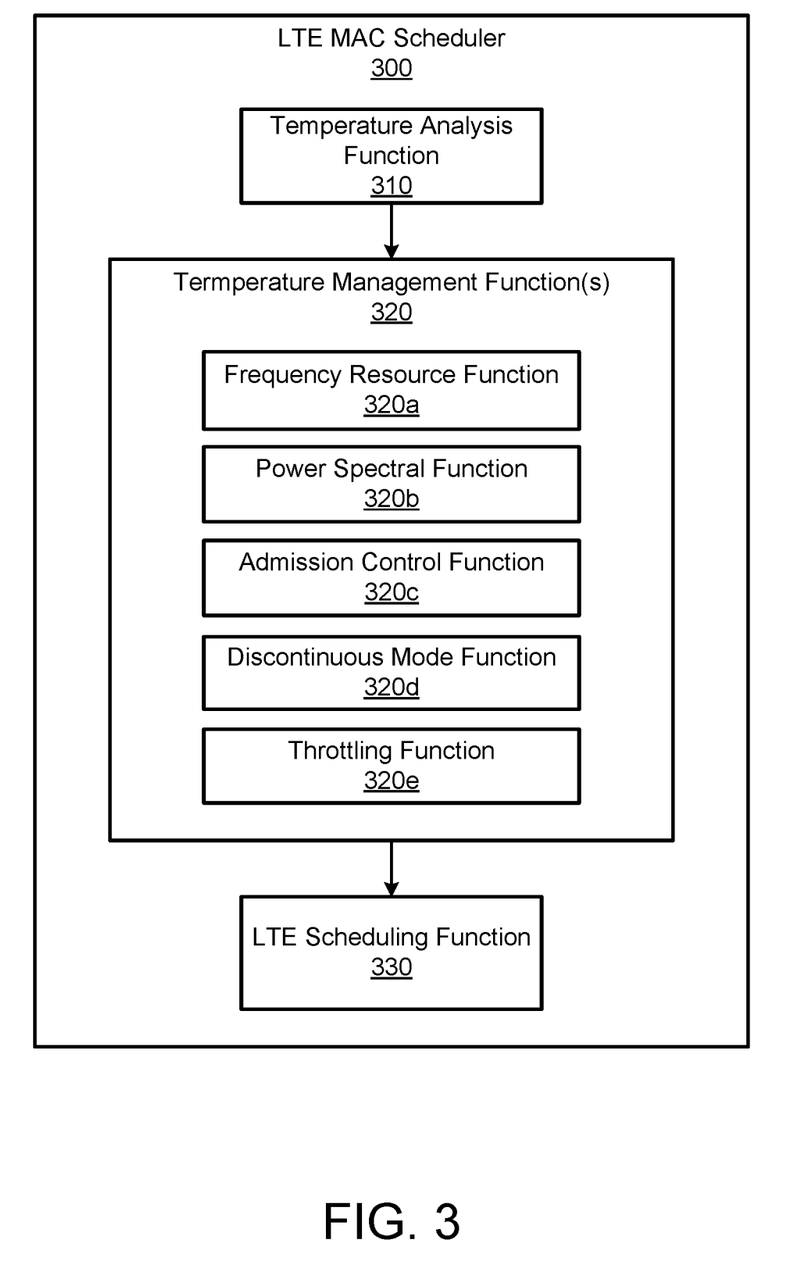
FIG. 3 is a perspective view of an exemplary scheduler of FIG. 2.

Referring additionally to FIG. 3, the MAC scheduler 300 receives an input variable, i.e., one or more temperature measurements 232 outputted from the temperature sensor 230. In response to receiving the one or more temperature measurements 232, the MAC scheduler 300 executes a temperature analysis function 310, which may be stored in the memory hardware 212. In some implementations, the temperature analysis function 310 is a comparison and/or filtering operation that determines whether the temperature measurement 232 exceeds a threshold value. When the temperature measurement 232 exceeds the threshold value, the MAC scheduler 300 recognizes that the femtocell 200 is operating outside of an acceptable operating range (e.g., outside an acceptable temperature range). Accordingly, the MAC scheduler 300 implements one or more temperature management functions 320 to reduce a power consumption of the femtocell 200 by reducing a transmission power, modifying frequency resources, and/or adjusting time slots. The temperature analysis function(s) 320 may also perform an averaging of temperature measurements 232 to reduce false positive threshold values.

The temperature management function(s) 320 can be any one or a combination of a frequency resource function 320a, a power spectral function 320b, an admission control function 320c, a discontinuous mode function 320d, and a throttling function 320e. These functions, alone or in combination, are configured to modify a power consumption characteristic of the femtocell 200, thereby reducing the power consumption of the femtocell 200. The MAC scheduler 300 implements an adjustment 250 of the femtocell 200 using the one or more frequency resource functions 320, 320a-e.

Figure 4A:
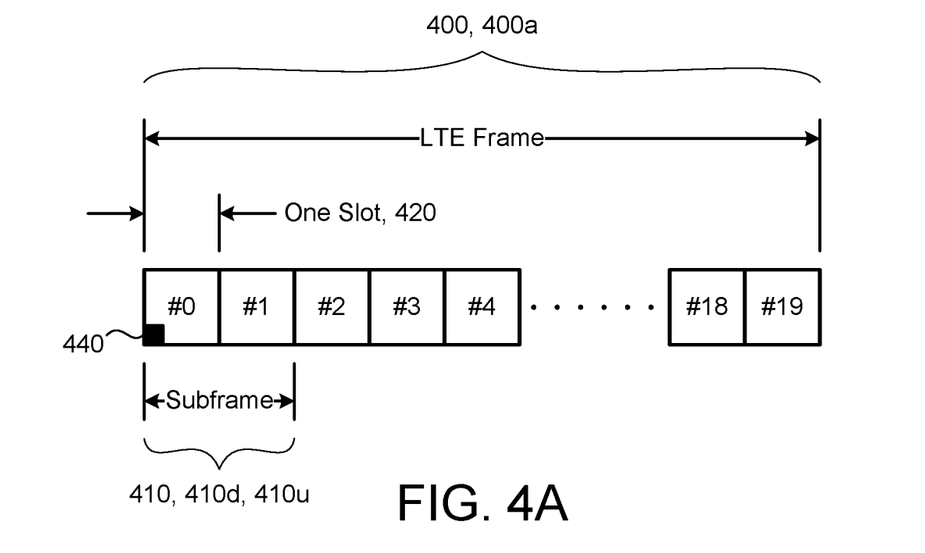
FIG. 4A is a schematic view of an example frame structures for a time division duplex mode of a femtocell.
Figure 4B:
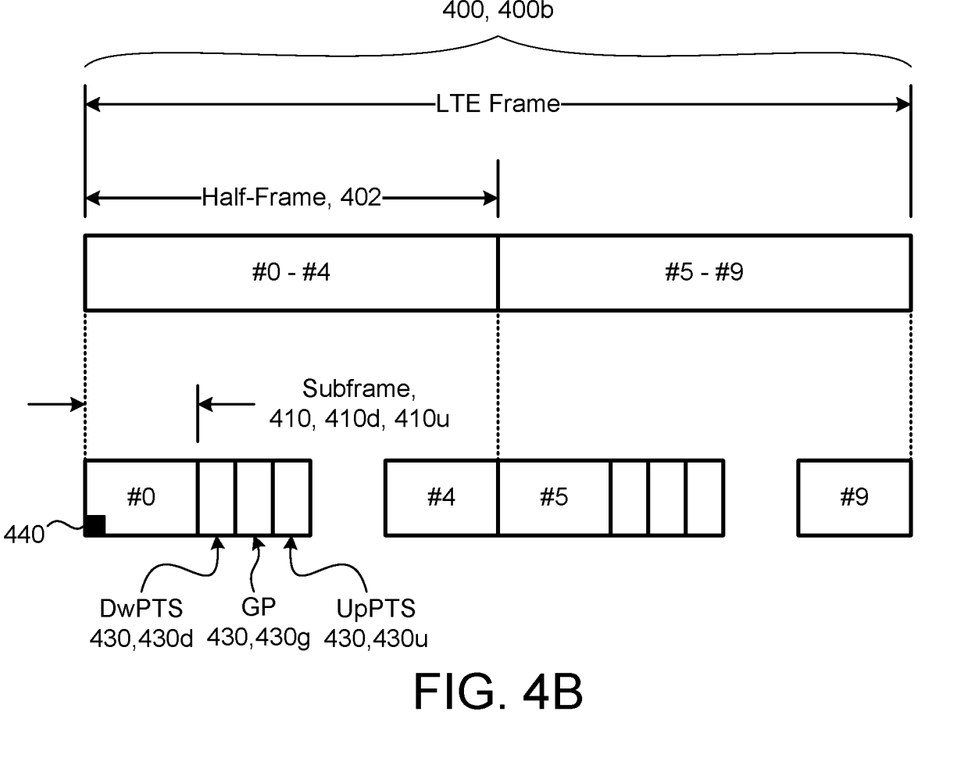
FIG. 4B is a schematic view of an example frame structures for a frequency division duplex mode of a femtocell.

Referring to FIGS. 4A and 4B, in order for the communication system 100 to maintain synchronization and manage different types of information carried between the base-station or eNodeB 120 and the UE 130, the communication system 100 has a defined LTE frame and subframe structure for the Evolved UMTS Terrestrial Radio Access (E-UTRA), i.e., the air interface. The frame structures for LTE differ between a time division duplex (TDD) mode and a frequency division duplex (FDD) mode, as there are different requirements on segregating the transmitted data. For the FDD mode, as illustrated in FIG. 4A, an LTE frame 400, 400a has an overall length of 10 ms, which is divided into 10 subframes 410 and 20 individual slots 420, where each subframe 410 includes two slots 420. For the TDD mode, as illustrated in FIG. 4B, the LTE frame 400, 400b, which is 10 ms long, comprises two half-frames 402, each 5 ms long. Moreover, each half-frame 402 is further split into five subframes 410, each 1 ms long. The subframes 410 may be divided into special subframes 430 that include three fields: downlink pilot time slot (DwPTS) 430d, guard period (GP) 430g, and uplink pilot time slot (UpPTS) 430u. In each mode, a subframe 410 can be designated as a downlink subframe 410d or an uplink subframe 410u.

The communication system 100 uses various "channels" to segregate the transportation of different types of data and to provide interfaces to higher layers within the LTE protocol structure that enables the orderly and defined segregation of the data. In general, there are three categories into which the various data channels may be grouped: physical channels, which are transmission channels that carry user data and control messages; transport channels, which are the physical layer transport channels for information transfer to medium access control (MAC) and higher layers; and logical channels, which provide services for the MAC layer within the LTE protocol structure. The physical channels are either downlink or uplink channels. The downlink channels may include a physical broadcast channel (PBCH) and a physical downlink shared channel (PDSCH). The PBCH carries system information for UEs 130 needing to access the network (the communication system 100). For example, the PBCH broadcasts a limited number of parameters needed for initial access of the femtocell 200, such as downlink system bandwidth, a physical hybrid ARQ indicator channel (PHICH) structure, and the most significant eight-bits of a system frame number. The PDSCH is generally the main data bearing channel that is allocated to UEs 130 on a dynamic and opportunistic basis. The PDSCH is also used to transmit broadcast information not transmitted on the physical broadcast channel (PBCH). The broadcast information may include system information blocks (SIB) and paging & radio resource control (RRC) signaling messages. The PDSCH may also used to transfer application data. On uplink side, the physical uplink shared channel (PUSCH) is generally used to carry RRC signaling messages, uplink control information (UCI) and application data. The PUSCH also generally carries uplink RRC messages.

Referring also to FIG. 3, the frequency resource function 320a reduces a frequency resource used by a downlink and/or an uplink, when communicating with UEs 130. In some implementations, the frequency resource function 320a reduces a number of frequency resources used by the PDSCH and/or the PUSCH. For example, the frequency resource function 320a causes the MAC scheduler 300 to schedule less UEs 130 per downlink subframe 410d or uplink subframe 410u. In additional examples, the MAC scheduler 300 schedules a reduced number of resource blocks per UE 130 for each downlink and/or uplink when implementing the frequency resource function 320a. Referring again to FIGS. 4A and 4B, a resource block 440 is the smallest unit of resources that can be allocated to a UE 130. For example, for the FDD mode, the resource block 440 may be 180 kHz wide in frequency and 1 slot long in time. Moreover, in frequency, resource blocks 440 can be either 12×15 kHz subcarriers or 24×7.5 kHz subcarriers wide, in some examples. The number of subcarriers used per resource block 440 for most channels and signals is 12 subcarriers. As described earlier, the PDSCH contains the data being sent to UEs 130. All resource blocks 440 are available for allocation, but only the subcarriers not reserved for control channels are available for carrying data. As illustrated, UEs 130 are allocated rectangular areas of resource blocks 440 and expect to find their data in those locations. Allocations can change each half-frame to work around channel effects, such as frequency nulls. The reduction of frequency resources on the PDSCH reduces a transmission power of the femtocell 200. The reduction of frequency resources on the PUSCH reduces a computational load on the data processing hardware 210.

The power spectral function 320b reduces a power spectral density of the power amplifier 220. In some examples, the MAC scheduler 300 reduces the power spectral density on the PDSCH. The reduction of power spectral density is relative to a common reference signal power. Power spectral density is a measure of a signal's power intensity in the frequency domain. In practice, the power spectral density is computed from a fast Fourier transform (FFT) spectrum of a signal. The power spectral density provides a useful way to characterize the amplitude versus frequency content of a signal.

The admission control function 320c reduces a number of UEs 130 communicating with the femtocell 200. Consequently, the MAC scheduler 300 frees bandwidth of the femtocell 200 on both the PDSCH and PUSCH. In some examples, the MAC scheduler 300 denies access requests from UEs 130.

The discontinuous mode function 320d changes a reception mode of the UEs 130 to a discontinuous mode. The UEs 130 are placed in a discontinuous mode by the MAC scheduler 300. The discontinuous reception mode may be a connected discontinuous reception (DRX) mode or idle DRX mode. The discontinuous reception modes reduce schedule computation load on the data processing hardware 210, reception processing computation by the data processing hardware 210, and the transmission power of the femtocell 200. The DRX mode may be a function of how a transmission is structured. For example, slots 420 may have headers containing address details, and UEs 130 can listen to the headers in each slot 420 to decide whether the transmission is relevant to them or not. In this case, the UEs 130 only have to be active at the beginning of each slot 420 to receive the header. Other techniques include polling, whereby the UE 130 is placed into standby for a given amount of time and a femtocell 200 periodically sends a beacon indicating whether there is any waiting data for the UE 130. This is may be used in 802.11 wireless networks when compatible access cards and access points negotiate a power saving mode arrangement. The MAC scheduler 300 may implement one or more of these and other techniques to reduce the scheduling load, thereby reducing the computation load on the data processing hardware 210.

The throttling function 320e reduces a transmission duty cycle of the femtocell 200. The femtocell 200 can perform decimation in a time domain by scheduling only on certain interlaces or subframes 410. In some examples, the MAC scheduler 300 reduces transmission and reception duty cycles by sending information on selected subframes 410. The throttling function 320e thereby reduces the computation load on the data processing hardware 210 and overall power consumption of the femtocell 200 by reducing the transmit/receive duty cycles.

Figure 5:
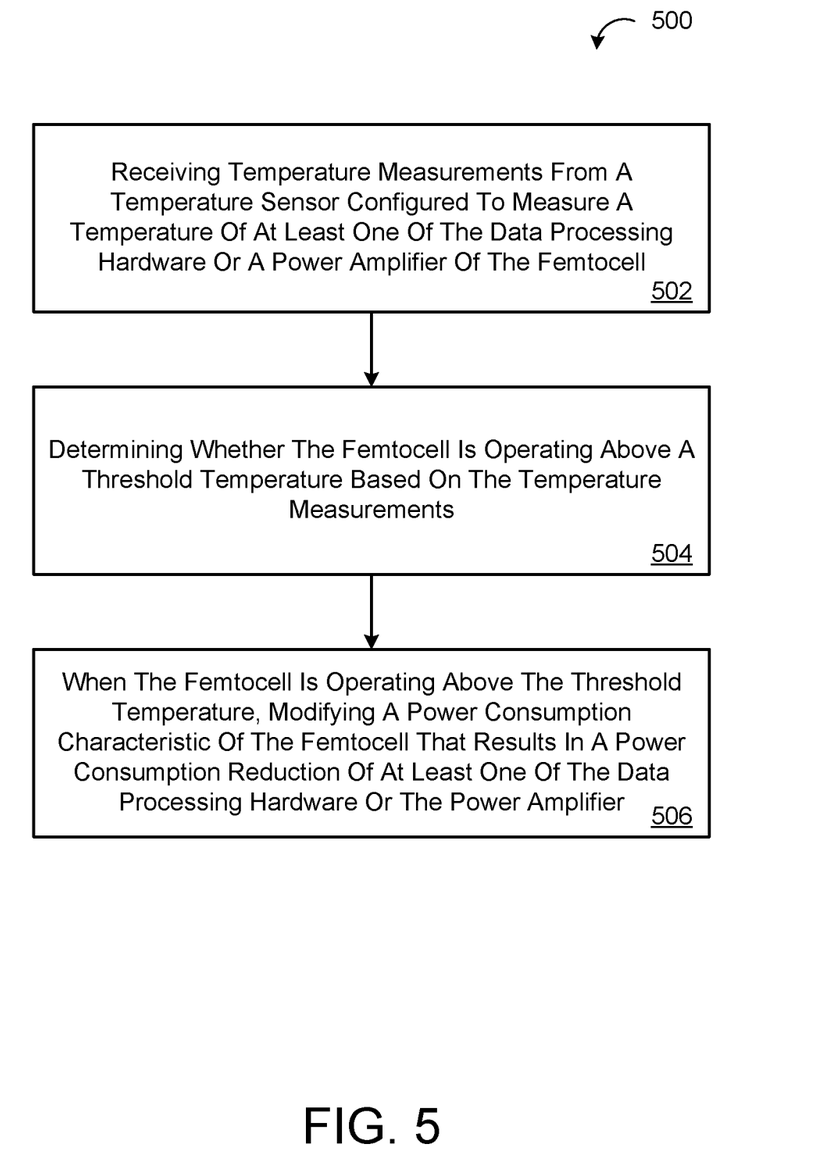
FIG. 5 is a flowchart providing an example arrangement of operations for a method of controlling temperature of a cellular base station.

FIG. 5 provides a schematic view of an exemplary arrangement of operations for a method 500 of controlling a temperature of a cellular base station, such as a femtocell 200. At operation 502, the method 500 includes receiving, at data processing hardware 210 of the femtocell 200, temperature measurements 232 from a temperature sensor 230 configured to measure a temperature of at least one of the data processing hardware 210 or a power amplifier 220 of the femtocell 200. At operation 504, the method 500 further includes determining, by the data processing hardware 210, whether the femtocell 200 is operating above a threshold temperature based on the temperature measurements 232. When the femtocell 200 is operating above the threshold temperature, at operation 506, the method 500 includes modifying, by the data processing hardware 210, a power consumption characteristic of the femtocell 200 that results in a power consumption reduction of at least one of the data processing hardware 210 or the power amplifier 220.

In some implementations, modifying the power consumption characteristic includes reducing a PDSCH frequency resource and/or a PUSCH frequency resource to communicate with UEs 130. In some examples, reducing the PDSCH frequency resource includes scheduling a fewer number of UEs 130 per downlink subframe 410d of a corresponding downlink communication frame 400. For example, the method 500 may include scheduling a reduced number of UEs 130 than a current number of UEs 130 currently scheduled for a downlink subframe 410d of a corresponding downlink communication frame 400. Similarly, reducing the PUSCH frequency resource to communicate with UEs 130 may include scheduling a fewer number of UEs 130 per uplink subframe 410u of a corresponding uplink communication frame 400. For example, the method 500 may include scheduling a reduced number of UEs 130 than a current number of UEs 130 currently scheduled for a uplink subframe 410u of a corresponding uplink communication frame 400.

In some implementations, reducing the PDSCH resource and/or the PUSCH frequency resource includes scheduling a fewer number of resource blocks 440 per UE 130 (e.g., via the MAC scheduler 300. Each communication frame 400 includes sub-frames 410, which include resource blocks 440.

In additional implementations, modifying the power consumption characteristic includes reducing a power spectral density of the power amplifier 220. The power spectral density is a measure of the PDSCH.

In yet additional implementations, modifying the power consumption characteristic includes reducing a number of UEs 130 communicating with the femtocell 200. For example, the method may include denying access requests from UEs 130.

In some implementations, modifying the power consumption characteristic includes changing a reception mode of one or more UEs 130 communicating with the femtocell 200 to a discontinuous mode, such as the DRX mode. Additionally or alternatively, modifying the power consumption characteristic may include reducing a transmission duty cycle and/or a reception duty cycle of the femtocell 200.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a femtocell, temperature measurements from a temperature sensor of the femtocell configured to measure a temperature of at least one of the data processing hardware or a power amplifier of the femtocell, the femtocell comprising an access point configured to route mobile phone traffic through a mobile operator network to multiple user equipment devices;
determining, by the data processing hardware, whether the femtocell is operating above a threshold temperature based on the temperature measurements; and
when the femtocell is operating above the threshold temperature, modifying, by the data processing hardware, a power consumption characteristic of the femtocell based on a media access control layer schedule of the femtocell, the modified power consumption characteristic resulting in a power consumption reduction of at least one of the data processing hardware or the power amplifier.

2. The method of claim 1, wherein modifying the power consumption characteristic comprises denying access requests from user equipment devices requesting to communicate with the femtocell.

3. The method of claim 1, wherein modifying the power consumption characteristic comprises at least one of reducing frequency resources or adjusting time slots allocated to the user equipment devices for use by the user equipment devices when communicating with the femtocell.

4. The method of claim 3, wherein adjusting time slots comprises changing a reception mode of one or more of the user equipment devices communicating with the femtocell to a discontinuous mode.

5. The method of claim 3, wherein adjusting time slots comprises at least one of reducing a transmission duty cycle of the femtocell and reducing a reception duty cycle of the femtocell.

6. The method of claim 3, wherein reducing frequency resources comprises reducing a physical downlink shared channel frequency resource and/or a physical uplink shared channel frequency resource to communicate with the user equipment devices.

7. The method of claim 6, wherein reducing the physical downlink shared channel frequency resource comprises scheduling a fewer number of the user equipment devices per downlink subframe of a corresponding downlink communication frame, and reducing the physical uplink shared channel frequency resource to communicate with user equipment devices comprises scheduling a fewer number of the user equipment devices per uplink subframe of a corresponding uplink communication frame.

8. The method of claim 6, wherein reducing the physical downlink shared channel frequency resource and/or the physical uplink shared channel frequency resource comprises scheduling a fewer number of resource blocks per user equipment device.

9. The method of claim 1, wherein the power consumption characteristic is further modified by reducing a power spectral density of the power amplifier, wherein the power spectral density is a measure of a physical downlink shared channel.

10. The method of claim 1, wherein the power consumption characteristic is further modified by reducing a number of user equipment devices communicating with the femtocell.

11. A femtocell comprising:
a power amplifier;
data processing hardware configured to operate an access point, the access point routing mobile phone traffic through a mobile operator network to multiple user devices;
a temperature sensor configured to measure a temperature of at least one of the data processing hardware or the power amplifier; and
memory hardware in communication with the data processing hardware, the memory hardware storing instructions that when executed on the data processing hardware cause the data processing hardware to perform operations comprising:
receiving temperature measurements from the temperature sensor;
determining whether the femtocell is operating above a threshold temperature based on the temperature measurements; and
when the femtocell is operating above the threshold temperature, modifying a power consumption characteristic of the femtocell based on a media access control layer schedule of the femtocell, the modified power consumption characteristic resulting in a power consumption reduction of at least one of the data processing hardware or the power amplifier.

12. The femtocell of claim 11, wherein modifying the power consumption characteristic comprises denying access requests from user equipment devices requesting to communicate with the femtocell.

13. The femtocell of claim 11, wherein modifying the power consumption characteristic comprises at least one of reducing frequency resources or adjusting time slots allocated to the user equipment devices for use by the user equipment devices when communicating with the femtocell.

14. The femtocell of claim 13, wherein adjusting time slots comprises changing a reception mode of one or more user equipment devices communicating with the femtocell to a discontinuous mode.

15. The femtocell of claim 13, wherein adjusting time slots comprises at least one of reducing a transmission duty cycle of the femtocell and reducing a reception duty cycle of the femtocell.

16. The femtocell of claim 13, wherein reducing frequency resources comprises reducing a physical downlink shared channel frequency resource and/or a physical uplink shared channel frequency resource to communicate with the user equipment devices.

17. The femtocell of claim 16, wherein reducing the physical downlink shared channel frequency resource comprises scheduling a fewer number of the user equipment devices per downlink subframe of a corresponding downlink communication frame, and reducing the physical uplink shared channel frequency resource to communicate with the user equipment devices comprises scheduling a fewer number of the user equipment devices per uplink subframe of a corresponding uplink communication frame.

18. The femtocell of claim 16, wherein reducing the physical downlink shared channel frequency resource and/or the physical uplink shared channel frequency resource comprises scheduling a fewer number of resource blocks per user equipment device.

19. The femtocell of claim 11, wherein modifying the power consumption characteristic comprises reducing a power spectral density of the power amplifier, wherein the power spectral density is a measure of a physical downlink shared channel.

20. The femtocell of claim 11, wherein modifying the power consumption characteristic comprises reducing a number of user equipment communicating with the femtocell.

* * * * *